(12) United States Patent
Erickson et al.

(10) Patent No.: US 10,595,647 B2
(45) Date of Patent: Mar. 24, 2020

(54) BELT DRIVE FOR DISPENSING CUTLERY AND RELATED METHODS

(75) Inventors: Nathan J. Erickson, Bloomington, MN (US); Richard S. Walters, Port Washington, WI (US)

(73) Assignee: GPCP IP Holdings LLC, Atlanta, GA (US)

(*) Notice: Subject to any disclaimer, the term of this patent is extended or adjusted under 35 U.S.C. 154(b) by 1703 days.

(21) Appl. No.: 13/286,709

(22) Filed: Nov. 1, 2011

(65) Prior Publication Data

US 2012/0145735 A1 Jun. 14, 2012

Related U.S. Application Data

(60) Provisional application No. 61/422,686, filed on Dec. 14, 2010.

(51) Int. Cl.
| | |
|---|---|
| *B65G 59/00* | (2006.01) |
| *B65D 83/00* | (2006.01) |
| *A47F 1/10* | (2006.01) |
| *B65G 59/06* | (2006.01) |

(52) U.S. Cl.
CPC .............. *A47F 1/10* (2013.01); *B65G 59/067* (2013.01); *B65G 59/068* (2013.01)

(58) Field of Classification Search
USPC ....... 221/191, 194–196, 208, 210, 217, 218, 221/221, 224, 239, 241, 253, 258
See application file for complete search history.

(56) References Cited

U.S. PATENT DOCUMENTS

| | | | |
|---|---|---|---|
| 46,832 | A | 3/1865 | Thorpe |
| 592,105 | A | 10/1897 | Barnes |
| D32,913 | S | 7/1900 | Graf |
| 703,718 | A | 7/1902 | Cammann |
| 716,058 | A | 12/1902 | Lang et al. |
| 925,485 | A | 6/1909 | Lefler |
| 999,837 | A | 8/1911 | Morris et al. |
| 1,053,387 | A | 2/1913 | Hawley |
| 1,146,447 | A | 7/1915 | Prommel |
| 1,182,793 | A | 5/1916 | Richardson |
| 1,259,927 | A | 3/1918 | Swift |
| 1,261,835 | A | 4/1918 | Martin |

(Continued)

FOREIGN PATENT DOCUMENTS

| | | |
|---|---|---|
| CA | 2545745 A1 | 11/2006 |
| CN | 2865478 Y | 2/2007 |

(Continued)

OTHER PUBLICATIONS

Peel Adhesion for Single Coated Pressure-Sensitive Tapes 180 Angle, Aug. 1989, pp. 21-22.

(Continued)

*Primary Examiner* — Gene O Crawford
*Assistant Examiner* — Kelvin L Randall, Jr.

(57) ABSTRACT

A dispenser for dispensing cutlery may include a housing configured to contain a plurality of utensils for dispensing, a dispensing mechanism that includes at least one belt configured to be driven and separate a utensil from a stack of utensils, and at least one drive mechanism configured to drive the at least one belt. The dispenser may further include a receptacle configured to receive the utensil separated from the stack of utensils.

21 Claims, 3 Drawing Sheets

(56) References Cited

U.S. PATENT DOCUMENTS

| | | |
|---|---|---|
| 1,353,109 A | 9/1920 | Carr |
| 1,355,583 A | 10/1920 | Zeidler et al. |
| 1,482,071 A | 1/1924 | Duff et al. |
| 1,497,585 A | 6/1924 | Poole |
| 1,504,098 A | 8/1924 | Cathey |
| 1,546,077 A | 7/1925 | Hunter et al. |
| 1,547,151 A | 7/1925 | Watling |
| 1,560,938 A | 11/1925 | Lund |
| 1,577,302 A | 3/1926 | Schultz |
| 1,610,001 A | 12/1926 | Foster |
| 1,635,386 A | 7/1927 | Pierson |
| 1,675,510 A | 7/1928 | Nolan |
| 1,767,634 A | 6/1930 | Weiss |
| 1,821,377 A | 9/1931 | Cusick |
| 1,886,378 A | 11/1932 | Dearsley |
| 1,936,057 A | 11/1933 | Hodge |
| 2,052,505 A | 8/1936 | Vetrosky |
| 2,053,828 A | 9/1936 | Harper |
| 2,078,984 A | 5/1937 | Williamson |
| 2,089,378 A | 8/1937 | Jenkin |
| 2,110,189 A | 3/1938 | Zeidler, Sr. |
| 2,141,684 A | 12/1938 | Diemer |
| 2,149,098 A * | 2/1939 | Phinney ............... 221/293 |
| 2,149,099 A | 2/1939 | Phinney et al. |
| 2,160,374 A | 5/1939 | Veillette |
| 2,184,029 A | 12/1939 | Wicklund |
| 2,188,573 A | 1/1940 | Longo |
| D119,760 S | 4/1940 | Kopp |
| 2,207,528 A | 7/1940 | Witt |
| 2,223,347 A | 12/1940 | Axthelm |
| 2,239,196 A | 4/1941 | Lunvik |
| 2,246,852 A | 6/1941 | Kale |
| 2,260,596 A | 10/1941 | Young |
| 2,268,596 A | 1/1942 | Jerum |
| 2,268,873 A * | 1/1942 | Hopkins et al. ............... 221/242 |
| 2,328,486 A | 8/1943 | Painter |
| 2,340,561 A | 2/1944 | Renfro |
| 2,421,782 A | 6/1947 | Gibbs et al. |
| 2,427,321 A | 9/1947 | Casey et al. |
| 2,433,736 A | 12/1947 | Carew |
| 2,472,051 A | 5/1949 | Testi |
| 2,497,718 A | 2/1950 | Earley et al. |
| 2,503,741 A | 4/1950 | Johnson |
| 2,526,136 A | 10/1950 | Holzknecht |
| 2,571,668 A | 10/1951 | Booth et al. |
| 2,577,344 A | 12/1951 | Masure |
| 2,624,093 A | 1/1953 | Hatch et al. |
| 2,635,025 A | 4/1953 | Ziska |
| 2,646,874 A | 7/1953 | Testi |
| 2,651,093 A | 9/1953 | Lynch |
| 2,671,555 A | 3/1954 | Shnitzler |
| 2,692,691 A | 10/1954 | Harriss et al. |
| 2,695,125 A * | 11/1954 | Bowen ............... 53/299 |
| 2,752,678 A | 7/1956 | Welch |
| 2,800,013 A | 7/1957 | George |
| 2,806,634 A | 9/1957 | Baumgartner |
| 2,843,909 A | 7/1958 | Eilertsen |
| 2,845,679 A | 8/1958 | Baruch |
| 2,857,645 A | 10/1958 | Vogelsang |
| 2,868,344 A | 1/1959 | Shields |
| 2,870,505 A | 1/1959 | Hawie |
| 2,877,490 A | 3/1959 | Greninger |
| 2,877,926 A | 3/1959 | Abbe |
| 2,880,907 A | 4/1959 | Mainers |
| 2,889,076 A | 6/1959 | Van Schie |
| 2,911,127 A | 11/1959 | Driss et al. |
| 2,924,357 A | 2/1960 | Kingsley et al. |
| 2,946,431 A | 7/1960 | Nissen |
| 2,946,481 A | 7/1960 | Carew |
| 2,953,170 A * | 9/1960 | Bush ............... 141/18 |
| 2,954,948 A | 10/1960 | Johnson |
| 2,965,262 A | 12/1960 | Du Bois |
| 3,037,257 A | 6/1962 | Girodet |
| 3,052,006 A | 9/1962 | Jonas |
| 3,083,879 A | 4/1963 | Coleman |
| 3,095,114 A | 6/1963 | Tobias |
| 3,100,842 A | 8/1963 | Tellefsen |
| 3,114,475 A | 12/1963 | Etes |
| 3,116,152 A * | 12/1963 | Smith ............... 426/115 |
| 3,132,765 A | 5/1964 | Florendo |
| 3,146,908 A | 9/1964 | Perri et al. |
| 3,163,327 A | 12/1964 | Maxwell |
| 3,180,489 A | 4/1965 | McGinn |
| 3,182,345 A | 5/1965 | Smith |
| 3,263,860 A | 8/1966 | Haas |
| 3,279,652 A | 10/1966 | Willvonseder |
| 3,300,087 A | 1/1967 | Kuypers |
| 3,310,271 A | 3/1967 | King |
| 3,313,452 A | 4/1967 | Katz |
| 3,334,784 A | 8/1967 | Morrison |
| 3,338,471 A | 8/1967 | De Good |
| 3,371,821 A * | 3/1968 | Abood, Jr. et al. ............... 221/93 |
| 3,383,018 A * | 5/1968 | Grimsley ............... 222/108 |
| 3,400,435 A | 9/1968 | Akesson-Rydin |
| 3,402,441 A | 9/1968 | Woskin |
| 3,407,927 A | 10/1968 | Jones |
| 3,408,708 A | 11/1968 | Hawie |
| 3,426,941 A | 2/1969 | Hovekamp |
| 3,435,491 A | 4/1969 | Shears |
| 3,472,421 A | 10/1969 | Bailer |
| 3,499,538 A | 3/1970 | Sherard |
| 3,558,006 A | 1/1971 | Redmond et al. |
| 3,587,922 A | 6/1971 | Oriti |
| 3,654,396 A | 4/1972 | Biezeveld |
| 3,680,736 A | 8/1972 | Viessmann |
| 3,710,535 A * | 1/1973 | Walter ............... 53/398 |
| 3,741,410 A | 6/1973 | Henschke et al. |
| 3,747,803 A | 7/1973 | Zoepf et al. |
| 3,786,959 A | 1/1974 | Greb et al. |
| 3,851,762 A | 12/1974 | Liblick |
| 3,861,563 A | 1/1975 | Lisbin |
| 3,862,702 A | 1/1975 | Johnson |
| 3,897,886 A | 8/1975 | Franklin |
| 3,932,978 A | 1/1976 | Kinney |
| 3,972,118 A | 8/1976 | Richard |
| 3,987,901 A | 10/1976 | Dullinger |
| 4,043,203 A | 8/1977 | Montesi |
| 4,048,915 A | 9/1977 | Martin |
| 4,091,915 A | 5/1978 | Claasen |
| 4,120,662 A | 10/1978 | Fosslien |
| 4,134,519 A | 1/1979 | Barnett et al. |
| 4,146,123 A | 3/1979 | Cottrell |
| 4,271,999 A | 6/1981 | Stravitz |
| 4,288,003 A | 9/1981 | Fries |
| 4,308,974 A * | 1/1982 | Jones ............... 221/196 |
| 4,317,284 A | 3/1982 | Prindle |
| 4,489,854 A | 12/1984 | Wenkman et al. |
| 4,524,512 A | 6/1985 | Formo et al. |
| 4,570,536 A | 2/1986 | Dodd |
| 4,571,773 A | 2/1986 | Yuda |
| 4,574,423 A | 3/1986 | Ito et al. |
| D284,442 S | 7/1986 | Chan |
| 4,601,386 A | 7/1986 | Antonello |
| 4,610,087 A | 9/1986 | Mickelson et al. |
| 4,614,004 A | 9/1986 | Oshida |
| 4,624,616 A | 11/1986 | Freese |
| 4,662,536 A | 5/1987 | Powers |
| 4,666,060 A | 5/1987 | Bouldin |
| 4,691,811 A | 9/1987 | Arakawa et al. |
| 4,697,673 A | 10/1987 | Omata |
| 4,707,251 A | 11/1987 | Jenkins et al. |
| 4,715,514 A | 12/1987 | Vidondo |
| 4,789,064 A | 12/1988 | Segal |
| 4,835,864 A | 6/1989 | Tang |
| 4,863,033 A | 9/1989 | Buj |
| D305,709 S | 1/1990 | Blignaut |
| 4,896,792 A | 1/1990 | Marchand |
| 4,915,578 A * | 4/1990 | Becker ............... 414/797.6 |
| 4,921,106 A | 5/1990 | Spatafora et al. |
| 4,950,120 A | 8/1990 | Barnes |
| 4,961,684 A | 10/1990 | Provan |
| 4,963,072 A * | 10/1990 | Miley et al. ............... 414/797.6 |
| 4,973,037 A | 11/1990 | Holbrook |
| 4,986,442 A | 1/1991 | Hinterreiter |

(56) References Cited

U.S. PATENT DOCUMENTS

| | | | |
|---|---|---|---|
| 4,995,154 A | 2/1991 | Bamber | |
| D318,600 S | 7/1991 | Lillelund et al. | |
| 5,064,093 A | 11/1991 | Davis et al. | |
| 5,080,257 A | 1/1992 | Carnisio | |
| 5,127,546 A * | 7/1992 | Chen | 221/242 |
| 5,131,586 A | 7/1992 | Capy | |
| 5,161,268 A | 11/1992 | Harrow | |
| 5,176,494 A * | 1/1993 | Nigrelli et al. | 414/795.6 |
| 5,191,997 A | 3/1993 | Squitieri | |
| 5,211,267 A | 5/1993 | Clark | |
| 5,249,705 A | 10/1993 | Gates | |
| D342,648 S | 12/1993 | Cautereels et al. | |
| 5,269,397 A | 12/1993 | Kawamoto et al. | |
| 5,327,650 A | 7/1994 | Rojas | |
| D351,085 S | 10/1994 | Schmidt | |
| 5,364,016 A | 11/1994 | Capy et al. | |
| 5,413,317 A | 5/1995 | Spoerre | |
| D362,160 S | 9/1995 | Brabeck et al. | |
| 5,449,054 A | 9/1995 | Wiese et al. | |
| 5,460,252 A | 10/1995 | Kosugi et al. | |
| 5,469,688 A | 11/1995 | Dunbar et al. | |
| 5,479,708 A | 1/1996 | Thomas | |
| 5,497,863 A | 3/1996 | Schmidt et al. | |
| 5,509,522 A | 4/1996 | Laidlaw | |
| 5,518,149 A | 5/1996 | Lotspeich et al. | |
| 5,542,508 A | 8/1996 | Van Erden et al. | |
| 5,564,594 A | 10/1996 | Monfredo | |
| 5,586,685 A | 12/1996 | Dorner et al. | |
| 5,590,472 A | 1/1997 | Yaakov | |
| 5,605,208 A | 2/1997 | Friedrichsen et al. | |
| 5,660,252 A | 8/1997 | Lafon | |
| 5,762,211 A | 6/1998 | Ensign | |
| 5,845,403 A | 12/1998 | Nivin | |
| 5,853,092 A | 12/1998 | Goodman et al. | |
| 5,904,250 A | 5/1999 | Deschutter | |
| 5,921,408 A | 7/1999 | Groenewold et al. | |
| 5,933,918 A | 8/1999 | Wallays | |
| 5,950,842 A | 9/1999 | Bauer | |
| 5,961,021 A | 10/1999 | Koike et al. | |
| D420,887 S | 2/2000 | Chen | |
| 6,023,908 A | 2/2000 | Vetsch | |
| 6,023,913 A | 2/2000 | Gray et al. | |
| D422,431 S | 4/2000 | Goins | |
| 6,047,830 A | 4/2000 | Chang | |
| 6,085,916 A | 7/2000 | Kovacevic et al. | |
| 6,098,379 A | 8/2000 | Spatafora et al. | |
| 6,115,921 A | 9/2000 | Garneau | |
| 6,134,790 A | 10/2000 | Watson | |
| 6,202,891 B1 | 3/2001 | Mark | |
| 6,226,845 B1 | 5/2001 | Fink | |
| 6,250,498 B1 * | 6/2001 | Lovejoy | 221/185 |
| 6,289,889 B1 * | 9/2001 | Bell et al. | 126/263.07 |
| 6,298,960 B1 | 10/2001 | Derr | |
| 6,336,568 B1 * | 1/2002 | Tucker et al. | 221/131 |
| 6,378,729 B1 * | 4/2002 | Kodama | 221/196 |
| D458,070 S | 6/2002 | Bennett et al. | |
| 6,399,079 B1 * | 6/2002 | Mehta et al. | 424/400 |
| 6,412,398 B1 | 7/2002 | Norcross et al. | |
| 6,415,465 B1 | 7/2002 | Harrow | |
| 6,575,313 B1 | 6/2003 | Chen | |
| 6,626,633 B2 | 9/2003 | Jendzurski et al. | |
| 6,651,841 B2 | 11/2003 | Tsuchida | |
| 6,749,074 B1 | 6/2004 | Hileman et al. | |
| D492,549 S | 7/2004 | Welch | |
| D493,337 S | 7/2004 | Welch | |
| 6,763,972 B2 | 7/2004 | Graupner | |
| 6,786,357 B2 | 7/2004 | Renard | |
| 6,786,359 B2 | 9/2004 | Schroeder | |
| 6,832,694 B2 | 12/2004 | Goeking et al. | |
| 6,832,698 B1 * | 12/2004 | Dybul | 221/221 |
| 6,837,028 B1 | 1/2005 | Miano et al. | |
| 6,840,353 B2 | 1/2005 | Arisaka | |
| 6,840,420 B1 | 1/2005 | Hudson | |
| 6,863,173 B2 | 3/2005 | Bennett | |
| 6,880,211 B2 | 4/2005 | Jackson et al. | |
| 6,895,672 B2 | 5/2005 | Conforti | |
| 6,945,427 B2 | 9/2005 | Hieb | |
| 6,972,033 B2 | 12/2005 | McNicholas | |
| 6,976,348 B1 | 12/2005 | Miano et al. | |
| 7,013,568 B2 | 3/2006 | Schmidt | |
| 7,076,932 B2 * | 7/2006 | Rubin | 53/461 |
| 7,090,455 B2 | 8/2006 | Lamb | |
| 7,111,369 B2 | 9/2006 | Ho | |
| D533,034 S | 12/2006 | Wasserman | |
| 7,156,220 B2 | 1/2007 | Olson et al. | |
| D536,222 S | 2/2007 | Heiberg et al. | |
| 7,210,279 B1 | 5/2007 | Ahmed et al. | |
| 7,210,600 B1 * | 5/2007 | Delio, Jr. | 222/92 |
| 7,237,700 B2 | 7/2007 | Bulovic | |
| 7,322,172 B2 | 1/2008 | Hoffman et al. | |
| D564,819 S | 3/2008 | Fosburg et al. | |
| 7,412,808 B2 | 8/2008 | Lavi | |
| D591,104 S | 4/2009 | Oakes | |
| 7,513,089 B2 * | 4/2009 | Rubin | B65B 11/00 221/123 |
| 7,516,831 B2 | 4/2009 | Chang | |
| 7,520,247 B2 | 4/2009 | Rutledge | |
| 7,669,256 B2 | 3/2010 | Harrow | |
| 7,716,842 B2 | 5/2010 | Sumner-Trivisani et al. | |
| 7,731,899 B2 | 6/2010 | Talmer et al. | |
| 7,819,234 B2 | 10/2010 | Herzog | |
| 7,856,722 B2 | 12/2010 | Lago-Arenas | |
| 8,070,013 B2 * | 12/2011 | Reinsel et al. | 221/255 |
| 8,114,357 B2 * | 2/2012 | Calvert | A61L 2/18 422/28 |
| 8,152,004 B2 * | 4/2012 | Smith et al. | 211/70.7 |
| 8,210,364 B2 * | 7/2012 | Smith et al. | 211/70.7 |
| 8,272,533 B1 | 9/2012 | D'Amelia | |
| 8,296,957 B2 | 10/2012 | Muehlemann | |
| 8,297,473 B2 * | 10/2012 | Smith | 221/129 |
| 8,302,269 B2 | 11/2012 | Pitman | |
| 8,360,273 B2 * | 1/2013 | Reinsel et al. | 221/131 |
| 8,480,954 B2 | 7/2013 | Talmer et al. | |
| 9,439,518 B2 | 9/2016 | Oakes | |
| 9,560,920 B2 | 2/2017 | Oakes | |
| D783,303 S | 4/2017 | Roche | |
| D788,485 S | 6/2017 | Greenwald et al. | |
| 2002/0112445 A1 | 8/2002 | Scaduto | |
| 2003/0015824 A1 | 1/2003 | Forbes et al. | |
| 2003/0146061 A1 | 8/2003 | Tournier | |
| 2004/0045398 A1 | 3/2004 | Hayashi | |
| 2004/0045860 A1 | 3/2004 | Edgerly et al. | |
| 2004/0089670 A1 * | 5/2004 | Goeking et al. | 221/123 |
| 2004/0237311 A1 | 12/2004 | Brown et al. | |
| 2005/0082307 A1 | 4/2005 | Tucker | |
| 2005/0155186 A1 | 7/2005 | McGuyer et al. | |
| 2005/0155229 A1 | 7/2005 | Lee | |
| 2005/0252057 A1 | 11/2005 | Lavi | |
| 2006/0000190 A1 | 1/2006 | Behnke et al. | |
| 2006/0053638 A1 | 3/2006 | Sumner-Trivisani et al. | |
| 2006/0218795 A1 | 10/2006 | Santa Cruz et al. | |
| 2007/0108141 A1 * | 5/2007 | Smith et al. | 211/49.1 |
| 2007/0131705 A1 | 6/2007 | Behravesh et al. | 221/130 |
| 2007/0193968 A1 * | 8/2007 | Smith et al. | 211/70.7 |
| 2007/0214650 A1 | 9/2007 | Tomazini | |
| 2007/0035943 A1 | 10/2007 | Wang | |
| 2007/0250391 A1 | 10/2007 | Prade et al. | |
| 2008/0121650 A1 * | 5/2008 | Smith | 221/129 |
| 2008/0128445 A1 * | 6/2008 | Huang et al. | 221/7 |
| 2009/0194557 A1 | 8/2009 | Van Deursen | |
| 2010/0000096 A1 | 1/2010 | Muehlemann | |
| 2010/0084419 A1 * | 4/2010 | Reinsel et al. | 221/1 |
| 2010/0147869 A1 | 6/2010 | Iliffe et al. | |
| 2010/0170915 A1 * | 7/2010 | Reinsel et al. | 221/279 |
| 2011/0114660 A1 * | 5/2011 | Johansson | 221/43 |
| 2011/0180562 A1 | 7/2011 | Reinsel et al. | |
| 2011/0226797 A1 | 9/2011 | Reinsel et al. | |
| 2011/0296693 A1 | 12/2011 | Oakes | |
| 2012/0036724 A1 | 2/2012 | Walters | |
| 2012/0047744 A1 | 3/2012 | Walters | |
| 2012/0080444 A1 * | 4/2012 | Smith et al. | 221/208 |
| 2012/0110746 A1 | 5/2012 | Serrano | |
| 2012/0145734 A1 * | 6/2012 | Walters | 221/1 |
| 2012/0145736 A1 | 6/2012 | Walters et al. | |

(56) References Cited

U.S. PATENT DOCUMENTS

| | | | |
|---|---|---|---|
| 2013/0032609 A1* | 2/2013 | Righetti et al. | 221/103 |
| 2013/0043272 A1 | 2/2013 | Oakes | |
| 2013/0134211 A1 | 5/2013 | Linkel | |
| 2013/0152406 A1 | 6/2013 | McFarland | |
| 2013/0193157 A1 | 8/2013 | Jongen et al. | |
| 2014/0069930 A1 | 3/2014 | Oakes | |
| 2014/0191024 A1 | 7/2014 | Wnek et al. | |
| 2015/0001235 A9 | 1/2015 | Smith | |

FOREIGN PATENT DOCUMENTS

| | | | |
|---|---|---|---|
| CN | 101495015 A | 7/2009 | |
| DE | 7033238 U1 | 11/1970 | |
| DE | 7127677 U | 11/1971 | |
| DE | 3151268 | 7/1983 | |
| DE | 4139938 | 6/1993 | |
| DE | 9316566 | 1/1994 | |
| DE | 19906369 | 2/2000 | |
| DE | 202005013647 U1 | 7/2006 | |
| EP | 0257109 A1 | 8/1986 | |
| EP | 0856272 A2 | 1/1999 | |
| EP | 1022107 A1 | 7/2000 | |
| EP | 1217923 B1 | 9/2003 | |
| EP | 1358827 A3 | 11/2003 | |
| EP | 1213985 B1 | 6/2004 | |
| EP | 1514497 A1 | 3/2005 | |
| EP | 1719438 A1 | 11/2006 | |
| EP | 1864596 A2 | 12/2007 | |
| FR | 2889507 A1 | 2/2007 | |
| JP | H05-178336 U | 7/1993 | |
| JP | H06121727 A | 5/1994 | |
| JP | 08-047440 A | 2/1996 | |
| JP | 2007-319493 A | 12/2007 | |
| KR | 20-1991-0008085 Y1 | 10/1991 | |
| KR | 10-2009-0071515 A | 7/2009 | |
| KR | 10-0954569 B1 | 4/2010 | |
| WO | 01/05280 A1 | 1/2001 | |
| WO | 01/05281 A1 | 1/2001 | |
| WO | 01/68492 A1 | 9/2001 | |
| WO | 2004/028309 A1 | 4/2004 | |
| WO | 2007/049982 A1 | 5/2007 | |
| WO | 2007049982 A1 | 5/2007 | |
| WO | 2007/012606 A1 | 11/2007 | |
| WO | 2008/058187 A2 | 5/2008 | |
| WO | WO 2008058187 A2 * | 5/2008 | A47F 1/10 |
| WO | WO2009/137367 A2 | 11/2009 | |
| WO | 2017176918 A1 | 10/2017 | |

OTHER PUBLICATIONS

Tack Rolling Ball, Aug. 1989, pp. 29-30.
Holding Power of Pressure-Sensitive Tape, Aug. 1989, pp. 31-33.
European Patent Report 06009258.2, dated Jul. 24, 2006, five pages, Munich, Germany.
International Search Report and Written Opinion for PCT/US07/83752, dated Mar. 11, 2008, ten pages, European Patent Office, Munich, Germany.
Partial International Search Report for PCT/US2007/083922, dated Jul. 8, 2008, two pages.
European Search Report for EP 08 014 387.8 dated Nov. 11, 2008, two pages, European Patent Office, Munich, Germany.
International Search Report and Written Opinion for PCT/US2007/083922, dated Nov. 17, 2008, 13 pages, European Patent Office, Rijswijk, Netherlands.
International Search Report and Written Opinion for PCT/US2009/059915, dated Feb. 3, 2010, 13 pages, European Patent Office, Munich, Germany.
Office Actions for U.S. Appl. No. 11/556,808, filed Nov. 6, 2006.
Office Actions for U.S. Appl. No. 11/415,836, filed May 2, 2006.
Office Actions for U.S. Appl. No. 11/936,401, filed Nov. 7, 2007.
Office Action for U.S. Appl. No. 12/349,203, filed Jan. 6, 2009.
International Search Report and Written Opinion of the International Search Authority for PCT/US2011/058767 dated Feb. 29, 2012.
International Search Report and Written Opinion for PCT/US2011/044931 dated Feb. 28, 2012.
International Search Report and Written Opinion for PCT/US2011/044934 dated Mar. 6, 2012.
International Search Report and Written Opinion for PCT/US2011/064057, dated Feb. 29, 2012.
International Search Report and Written Opinion for PCT/US2011/058329; dated Feb. 29, 2012.
Supplementary European Search Report dated Sep. 25, 2013 for Application No. 11793088.3.
International Search Report for International Application No. PCT/US2010/000051, mailed by the International Searching Authority dated Aug. 16, 2010.
Written Opinion for International Application No. PCT/US2010/000051, mailed by the International Searching Authority dated Aug. 16, 2010.
International Search Report for International Application No. PCT/US2014/051639, mailed by the International Searching Authority dated Dec. 9, 2014.
Written Opinion for International Application No. PCT/US2014/051639, mailed by the International Searching Authority dated Dec. 9, 2014.
International Search Report and Written Opinion mailed in International Application No. PCT/US2019/014173 dated Jul. 3, 2019.

* cited by examiner

BELT DRIVE FOR DISPENSING CUTLERY AND RELATED METHODS

CROSS-REFERENCE TO RELATED APPLICATION

This application claims priority to U.S. Provisional Patent Application No. 61/422,686 filed Dec. 14, 2010, the disclosure of which is incorporated herein in its entirety by this reference.

FIELD OF THE DISCLOSURE

The present disclosure relates to dispensing cutlery. In particular, the present disclosure relates to dispensers for dispensing utensils, dispensing mechanisms for dispensing utensils, and related methods.

BACKGROUND

Disposable cutlery may be provided as a less expensive alternative to reusable cutlery, for example, at restaurants and social gatherings where it is undesirable or cost prohibitive to clean the cutlery for reuse. However, providing disposable cutlery may present a number of potential drawbacks related to the nature in which it is dispensed.

For example, providing disposable cutlery in a loose or unpackaged fashion, such as in loose form in a receptacle containing the disposable cutlery, may result in patrons taking more cutlery than necessary, thereby increasing the cost of providing the cutlery. In addition, providing loose or unpackaged cutlery may present concerns regarding whether dispensing cutlery in such a manner is hygienic. As a result, it may be desirable to dispense disposable cutlery in a manner other than in a loose or unpackaged form.

The above-noted concerns may be addressed by dispensing disposable cutlery from dispensers configured to contain a supply of the cutlery and dispense a disposable utensil upon operation of a patron. However, the complexity and expense of many dispensers may reduce the benefit to the purchaser of the dispenser. Thus, it may be desirable to provide a simple and reliable dispenser in order to further reduce costs and increase efficiency.

In addition, it may be desirable to provide a dispenser that is capable of dispensing utensils without flipping or otherwise altering the orientation of the utensils during the dispensing process. For example, some dispensers may cause utensils to flip or rotate within the dispenser as a stack of the utensils slides within the dispenser, which may lead to jamming the dispenser, thereby potentially compromising its utility.

Additionally, it may be desirable to provide a dispenser capable of reliably dispensing utensils. Dispensers that lack a reliable dispensing mechanism may have a tendency to cause patrons to unintentionally dispense more than one utensil at a time and/or jam the dispenser such that no utensils can be dispensed until the dispenser is manually un-jammed. This may result in compromising one of the potential advantages of dispensing utensils via a dispenser—reducing costs associated with patrons taking more utensils than necessary.

Thus, it is desirable to provide a system and method for addressing one or more of the potential drawbacks discussed above.

SUMMARY

In the following description, certain aspects and embodiments will become evident. It should be understood that the aspects and embodiments, in their broadest sense, could be practiced without having one or more features of these aspects and embodiments. Thus, it should be understood that these aspects and embodiments are merely exemplary.

One aspect of the disclosure relates to a dispenser for dispensing cutlery. The dispenser may include a housing configured to contain a plurality of utensils for dispensing, a dispensing mechanism that includes at least one belt configured to be driven and separate a utensil from a stack of utensils in a direction substantially perpendicular to a longitudinal axis of the utensil, and at least one drive mechanism configured to drive the at least one belt. According to some embodiments, the at least one belt may be configured to interact based at least in part on the shape of the utensil. For example, the positioning of the at least one belt may depend on the shape of the utensil rather than the location of other belts. The dispenser may also include a receptacle configured to receive the utensil separated from the stack of utensils. As used herein, "belt" may include at least one of a belt, a band, a cable, a chain, a rope, or the like. As used herein, "stack" does not necessarily mean a vertical stack, such that a group of nested, coupled, or similarly oriented utensils may extend at any angle ranging from horizontal to vertical.

Another aspect relates to a method for dispensing cutlery from a dispenser. The method may include providing a plurality of utensils for dispensing, indexing at least one belt associated with a stack of the plurality of utensils such that a utensil is separated from the stack of utensils in a direction substantially perpendicular to a longitudinal axis of the utensil, and providing access to the utensil separated from the stack of utensils.

BRIEF DESCRIPTION OF THE DRAWINGS

The accompanying drawings, which are incorporated in and constitute a part of this description, illustrate several embodiments and together with the description, serve to explain principles of the embodiments. In the drawings.

DETAILED DESCRIPTION OF EMBODIMENTS

Reference will now be made in detail to exemplary embodiments. Wherever possible, the same reference numbers are used in the drawings and the description to refer to the same or like parts.

Figure 1:
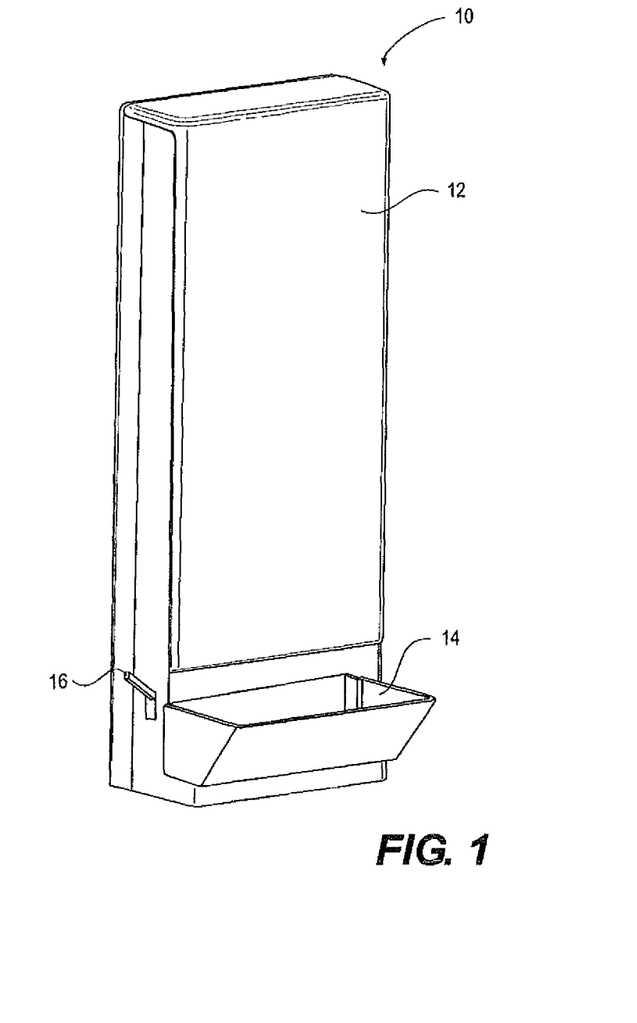
FIG. 1 is a schematic perspective view of an embodiment of a dispenser for dispensing utensils.

FIG. 1 shows a schematic perspective view of a dispenser 10 for dispensing utensils 20. Dispenser 10 includes a housing 12 configured to store a plurality of utensils 20 (see FIGS. 2 and 3). Housing 12 may be configured to receive utensils 20 in various arrangements. For example, housing 12 may be configured to receive one or more of loose utensils, cartridges containing utensils, stacks of utensils bound by a wrapper, and/or stacks of utensils removably coupled to one another. For example, housing 12 may include a chute configured to receive a plurality of utensils 20 in a stack 21. The chute of housing 12 may feed a dispensing mechanism 18 (see, e.g., FIGS. 2 and 3), which is configured to dispense at least one utensil 20, for example, individually. According to some embodiments, the stack 21 of utensils 20 may extend at any angle ranging from horizontal to vertical.

Dispenser 10 includes a receptacle 14 configured to receive utensils 20 dispensed from housing 12 by a dispensing mechanism 18. Dispensing mechanism 18 may be located inside dispenser 10. In some embodiments, dispensing mechanism 18 is located inside housing 12. Dispenser 10 may include an actuator 16 for operation of dispenser 10 by a user. Actuator 16 may be configured to activate dispensing mechanism 18 in order to dispense a utensil 20 from a stack 21 of utensils in housing 12. While FIG. 1 shows actuator 16 in the form of a handle, actuator 16 may be provided in any suitable form, for example, a rotatable knob, a button, a switch, a bar, an electronic sensor (e.g., a proximity sensor), and/or a crank. Additionally, according to some embodiments, actuator 16 may be incorporated into other aspects of dispenser 10. For example, actuator 16 may be incorporated into receptacle 14, such that a user may activate actuator 16 by manipulating receptacle 14 directly in order to operate dispensing mechanism 18. In some embodiments, actuator 16 may be incorporated into other aspects of dispenser 10, such as, for example, housing 12.

Figure 2:
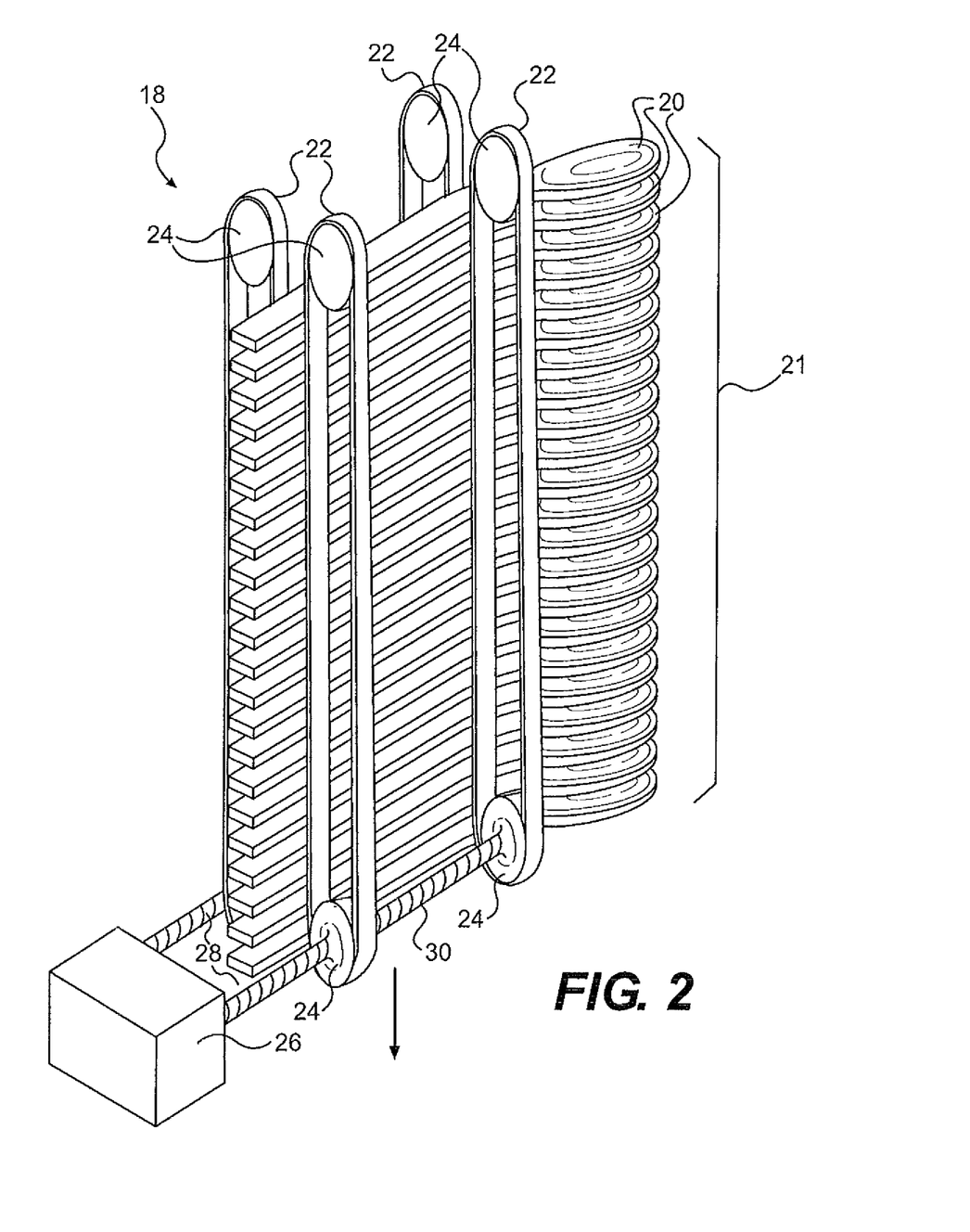
FIG. 2 is a schematic perspective view of a dispensing mechanism and a stack of utensils extending in a first direction.

FIG. 2 shows a schematic perspective view of dispensing mechanism 18 and a stack 21 of utensils. Utensils 20 are shown as spoons, but may be provided in any suitable form, for example, forks, knives, and/or sparks. In some embodiments, utensils 20 may have variable cross-sectional shapes, such that, for example, the portion of utensil 20 that is anticipated to contact dispensing mechanism 18 may be shaped to facilitate dispensing (e.g., it may have a handle portion that is generally consistent in cross-sectional shape over a portion of utensil 20), while other portions of utensil 20 may have different cross-sectional shapes. Utensils 20 may be constructed from a formable material. The formable material may include, for example, plastic, combinations of plastics, or combinations of plastics and other materials suitable for use as disposable or reusable cutlery. For example, the formable material may include one or more of polystyrene, polyethylene, and polypropylene. According to some embodiments, utensils 20 may be separably coupled to one another. For example, utensils 20 may be coupled by use of adhesive, spot welding, ultrasonic welding, vibration welding, soldering, hot melting, or any other suitable method.

According to some embodiments, dispensing mechanism 18 may facilitate the dispensing of utensils 20 from a stack 21 of utensils. In particular, dispensing mechanism 18 may be configured to retain a plurality of utensils 20 inside housing 12 until a user operates actuator 16 of dispenser 10. During operation, dispensing mechanism 18 may separate at least one utensil 20 from a stack 21 of utensils and allow the at least one utensil 20 to proceed, for example, via gravity, from dispensing mechanism 18 to receptacle 14, where it may be received by a user. In some embodiments, dispensing mechanism 18 may be operated via actuator 16. For example, a user may operate actuator 16 in a downward direction in order to operate dispensing mechanism 18 and dispense utensil 20. The method of operating actuator 16 in order to operate dispensing mechanism 18 may depend on the form of actuator 16, which may be provided in any suitable form, for example, a rotatable knob, a button, a switch, a bar, an electronic sensor, and/or a crank.

Dispensing mechanism 18 of FIG. 2. is shown with two pairs of belts 22 supporting a stack 21 of utensils. According to some embodiments, belts 22 may support utensils 20 by imparting force against utensils 20, resulting in static friction sufficient to prevent utensils 20 from changing their orientation. As used herein, "belt" is defined to include at least one of a belt, a band, a cable, a chain, a rope, or the like. In some embodiments, belts 22 may utilize protrusions (not shown) that support one or more utensils 20. The protrusions of belts 22 may be used to support utensils 20 instead of, or in addition to, the friction from the force of belts 22 against utensils 20.

In the embodiment shown in FIG. 2, each belt 22 is supported by at least two pulleys 24 that may provide an amount of tension in belts 22 sufficient to produce the desired friction for driving belts 22. According to some embodiments, the amount of tension in belts 22 may be adjustable for at least one belt 22. Belts 22 may be supported in a variety of ways. Belts 22 may utilize, for example, shafts, drums, and/or barrels instead of, or in addition to, pulleys 24. Additionally, belt 22 may be associated with more than two pulleys 24. The use of additional pulleys 24 may provide the ability to guide belt 22 in a more complex manner (e.g., such that belt 22 imparts different forces to different utensils, or such that any given location of belt 22 changes direction an additional number of times before returning to a starting position). In some embodiments, belts 22 may separate a utensil 20 from the stack of utensils 20 in a direction substantially perpendicular to a longitudinal axis of the utensil.

While only one belt may be needed, belts 22 may operate in pairs. For example, a pair of belts 22 may be positioned such that the stack of utensils 20 may be received between the pair of belts 22. For example, FIG. 2 shows two pairs of belts 22, with the two pairs of belts 22 being spaced from one another along the longitudinal length of the utensils 20. The stack of utensils 20 may also be received in the chute of housing 12. According to some embodiments, the spacing between belts 22 may be adjustable, such that the distance between two belts 22 in a pair of belts 22, or the distance between belts 22 spaced from one another along the longitudinal length of utensils 20, may be adjusted. In some embodiments, dispensing mechanism 18 may operate more efficiently when pairs of belts 22 rotate at a substantially similar rate. According to some embodiments, a drive mechanism 26 may be operably coupled to one or more pulleys 24, such that the one or more pulleys 24 may be driven. For example, drive mechanism 26 may be operably coupled to at least one pulley 24 via at least one drive shaft 28 operably coupled to drive mechanism 26 and the at least one pulley 24. For example, FIG. 2 shows one drive mechanism 26 with two drive shafts 28 that may operate to rotate one pair of belts 22 at similar speeds. Connecting shafts 30 may connect a plurality of pulleys 24 associated with different belts 22, as shown in FIG. 2. In some embodiments, connecting shafts 30 may allow multiple pairs of belts 22 to rotate at substantially similar speed, thereby providing proper operation of dispensing mechanism 18.

Drive mechanism 26 may comprise any type of mechanism that transfers force to pulleys 24 via actuation of actuator 16. In some embodiments, drive mechanism 26 may include at least one gear (e.g., a gearbox) associated with actuator 16. According to some embodiments, drive mechanism 26 may include an electric motor associated with actuator 16, for example, an actuator in the form of a proximity sensor. Alternatively, actuator 16 may be directly connected to drive shaft 28. According to some embodiments, drive mechanism 26 may include manual operation by a user, such as, for example, rotation of a knob operably coupled to pulleys 24.

According to some embodiments, dispensing mechanism 18 may separate utensil 20 from a stack of utensils by driving belts 22. For example, drive mechanism 26 may rotate at least one drive shaft 28, and, therefore, at least one pulley 24, such that the portion of at least one belt 22 that is in contact with the stack of utensils moves in a dispensing direction. The movement of belt 22 may cause at least a portion of the stack of utensils to move in the dispensing direction. When utensil 20 nears pulley 24, where belt 22 draws away from the stack of utensils, utensil 20 may be released from the stack of utensils due to, for example, the combination of gravity and a lack of friction from belt 22. After being dispensed by dispensing mechanism 18, utensil 20 may proceed to receptacle 14 (e.g., via gravity or via a mechanism that mechanically moves, or pushes, utensil 20 toward receptacle 14) to be received by a user.

Figure 3:
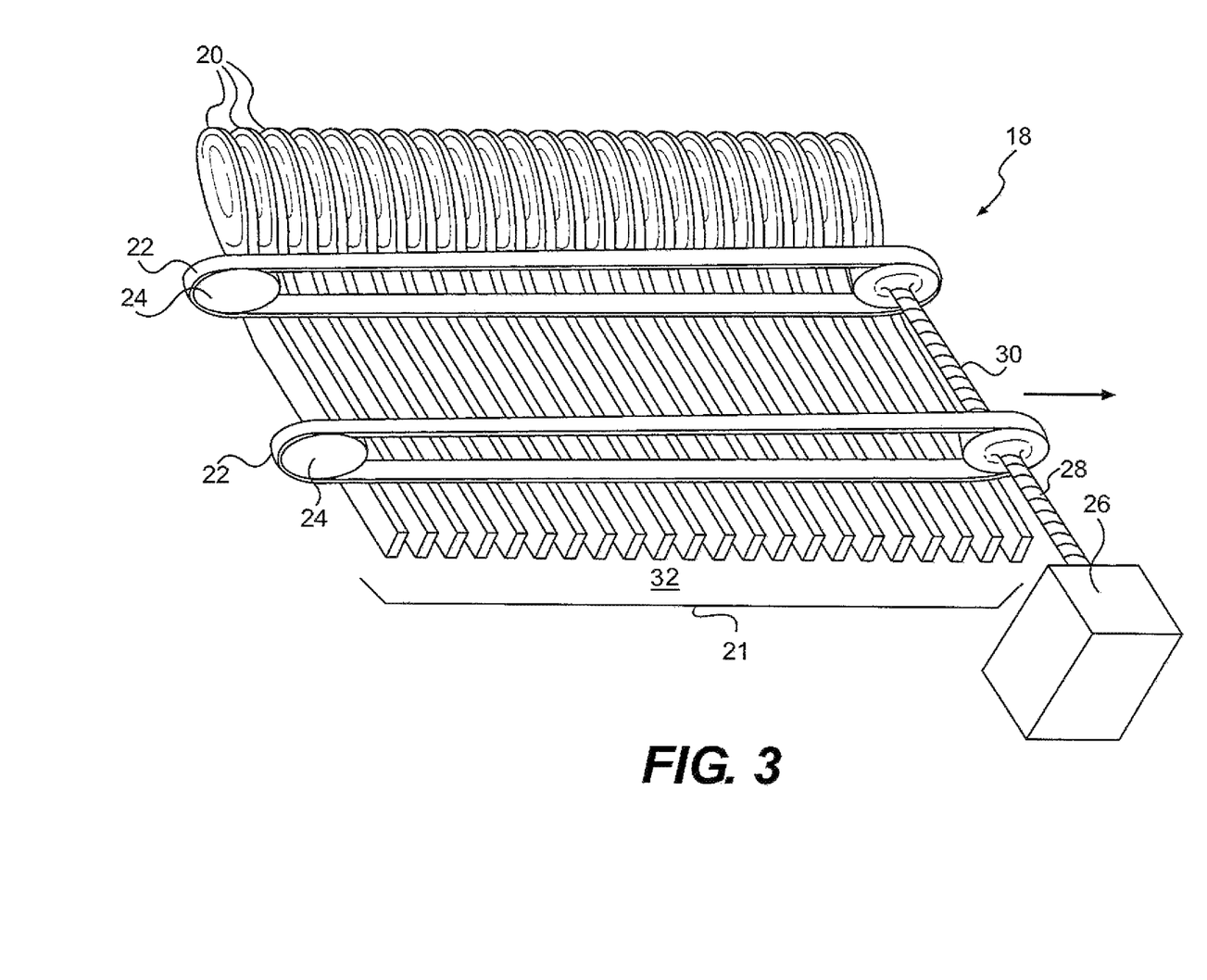
FIG. 3 is a schematic perspective view of a dispensing mechanism and a stack of utensils extending in a second direction.

According to some embodiments, dispensing mechanism 18 may be configured to dispense a stack of utensils in an orientation other than the orientation shown in FIG. 2 (e.g., an orientation that is not a vertical orientation). For example, FIG. 3 shows dispensing mechanism 18 configured to dispense utensils 20 from a stack of utensils in a second orientation (i.e., a horizontal orientation). In some embodiments, dispensing mechanism 18 may include one or more belts 22 on only one side of the stack 21 of utensils. FIG. 3, for example, shows two belts 22 positioned along one side of the stack of utensils. This orientation may be useful where, for example, the stack of utensils rests on a flat surface 32 with one side of the stack of utensils contacting the flat surface 32. In such circumstances, a single belt 22 may be configured to dispense utensil 20 from the stack of utensils. The orientation of FIG. 3 may be useful for dispensers that utilize less vertical space relative to some traditional, upright utensil dispensers.

According to some embodiments, dispensing mechanism 18 of FIG. 3 may be provided in a manner that could accommodate a nonlinear stack of utensils (e.g., a curved stack of utensils wherein a portion of the stack of utensils has an orientation similar to the stack of utensils shown in FIG. 2, while a different portion of the stack of utensils has an orientation similar to the stack of utensils shown in FIG. 3.) For example, belts 22 may utilize a plurality of pulleys 24 to conform belt 22 to at least a portion of the curved stack of utensils. This type of dispensing mechanism 18 may be useful in situations where, for example, a utensil provider desires a dispenser that takes advantage of a vertical utensil 20 loading position combined with a non-vertical dispensing position.

It will be apparent to those skilled in the art that various modifications and variations can be made to the structures and methodologies described herein. Thus, it should be understood that the invention is not limited to the subject matter discussed in the description. Rather, the present disclosure is intended to cover modifications and variations.

What is claimed is:

1. A dispenser for dispensing cutlery utensils, the dispenser comprising:
    a housing configured to contain a stack of nested cutlery utensils for dispensing, each cutlery utensil having an axial cross-section that varies along a length thereof;
    a dispensing mechanism comprising:
        at least one belt configured to contact a first side of the stack of nested cutlery utensils and to be driven and separate a cutlery utensil from the stack of nested cutlery utensils in a direction substantially perpendicular to a longitudinal axis of the cutlery utensil;
        a stationary support comprising a flat surface configured to contact an opposite second side of the stack of nested cutlery utensils; and
        at least one drive mechanism configured to drive the at least one belt; and
    a receptacle configured to receive the cutlery utensil separated from the stack of nested cutlery utensils.

2. The dispenser of claim 1, wherein the dispensing mechanism further comprises at least one pair of pulleys, and wherein the at least one belt is supported by the at least one pair of pulleys and configured to be driven around the at least one pair of pulleys.

3. The dispenser of claim 2, wherein the at least one drive mechanism is operably coupled to at least one of the pair of pulleys.

4. The dispenser of claim 1, wherein the at least one belt and the flat surface are spaced from one another and configured to receive the stack of nested cutlery utensils therebetween.

5. The dispenser of claim 4, wherein the at least one belt and the flat surface extend parallel to one another.

6. The dispenser of claim 1, wherein the at least one belt comprises a first belt and a second belt spaced apart from one another in a direction of the longitudinal axis.

7. The dispenser of claim 1, wherein each cutlery utensil comprises a head portion having a first width and a handle portion having a second width that is less than the first width, and wherein the at least one belt if configured to contact the handle portion of each cutlery utensil of the stack of nested cutlery utensils and be spaced apart from the head portion of each cutlery utensil of the stack of nested cutlery utensils.

8. The dispenser of claim 1, further comprising an actuator operably coupled to the at least one drive mechanism and configured to activate the at least one drive mechanism.

9. The dispenser of claim 8, wherein the actuator comprises at least one of a rotatable knob, a button, a switch, a bar, a lever, an electronic sensor, and a crank.

10. A method of dispensing cutlery utensils from a dispenser, the method comprising:
    providing a stack of nested cutlery utensils for dispensing, each cutlery utensil having an axial cross-section that varies along a length thereof and comprising:
        a head portion having a first width; and
        a handle portion having a second width that is less than the first width;
    supporting the stack of nested cutlery utensils with at least one belt contacting the handle portion of each cutlery utensil of the stack of nested cutlery utensils and spaced apart from the head portion of each cutlery utensil of the stack of nested cutlery utensils;
    indexing the at least one belt such that a cutlery utensil is separated from the stack of nested cutlery utensils in a direction substantially perpendicular to a longitudinal axis of the cutlery utensil; and
    providing access to the cutlery utensil separated from the stack of nested cutlery utensils.

11. The method of claim 10, wherein indexing the at least one belt comprises indexing at least one pair of pulleys around which the at least one belt is driven.

12. The method of claim 10, wherein indexing the at least one belt is facilitated by activating an actuator operably coupled to a drive mechanism configured to drive the at least one belt.

13. The method of claim 10, wherein the stack of nested cutlery utensils comprises a plurality of separably coupled cutlery utensils.

14. The method of claim 10, wherein providing access to the cutlery utensil comprises providing a receptacle positioned to receive the cutlery utensil separated from the stack of nested cutlery utensils.

15. The method of claim 13, wherein the plurality of separably coupled cutlery utensils are separably coupled to one another by at least one of an adhesive, welding, soldering, or hot melting.

16. The dispenser of claim 1, wherein the at least one belt and the flat surface extend in a substantially vertical direction and are configured to support the stack of nested cutlery utensils in a substantially vertical orientation.

17. The dispenser of claim 1, wherein the at least one belt and the flat surface extend in a substantially horizontal direction and are configured to support the stack of nested cutlery utensils in a substantially horizontal orientation.

18. A dispenser system for dispensing cutlery utensils, the dispenser system comprising:
a housing;
a stack of nested cutlery utensils contained within the housing for dispensing, each cutlery utensil having an axial cross-section that varies along a length thereof and comprising:
a head portion having a first width; and
a handle portion having a second width that is less than the first width;
a dispensing mechanism comprising:
at least one belt contacting the handle portion of each cutlery utensil of the stack of nested cutlery utensils and spaced apart from the head portion of each cutlery utensil of the stack of nested cutlery utensils, the at least one belt configured to be driven and separate a cutlery utensil from the stack of nested cutlery utensils in a direction substantially perpendicular to a longitudinal axis of the cutlery utensil; and
at least one drive mechanism configured to drive the at least one belt; and
a receptacle configured to receive the cutlery utensil separated from the stack of nested cutlery utensils.

19. The dispenser system of claim 18, wherein the at least one belt is spaced apart from the head portion of each cutlery utensil of the stack of nested cutlery utensils in a direction of the longitudinal axis.

20. The dispenser system of claim 19, wherein the at least one belt comprises a first belt and a second belt spaced apart from one another in the direction of the longitudinal axis.

21. The dispenser system of claim 20, wherein the first belt is spaced apart from the head portion of each cutlery utensil of the stack of nested cutlery utensils in the direction of the longitudinal axis by a first distance, wherein the second belt is spaced apart from the head portion of each cutlery utensil of the stack of nested cutlery utensils in the direction of the longitudinal axis by a second distance greater than the first distance.

* * * * *